Patented Sept. 24, 1946

2,408,131

UNITED STATES PATENT OFFICE 2,408,131

PROCESS FOR DEHYDROGENATING HYDROCARBONS

Alexis Voorhies, Jr., Baton Rouge, La., assignor to Standard Oil Development Company, a corporation of Delaware No Drawing. Application October 21, 1941, Serial No. 415,903

4 Claims. (Cl. 260—683.3)

This invention relates to catalysts useful in the dehydrogenation of hydrocarbons and is more particularly concerned with an improved catalyst which is characterized by the fact that it retains its activity, to a substantial extent, when heated to temperatures at which the known types of catalysts lose their activity, and with the method of preparing the same.

An especially effective catalyst for the dehydrogenation of hydrocarbons, particularly low molecular weight hydrocarbons having 2 to 5 carbon atoms, comprises a major proportion of aluminum oxide and a minor proportion of chromium oxide, for example, a catalyst consisting of about 96% aluminum oxide and about 4% of chromium oxide. A catalyst of this type is conveniently prepared by impregnating aluminum oxide with a solution of chromium nitrate and then heating the impregnated mass to convert the nitrate to the oxide. In order to increase the mechanical strength and durability of the catalyst it may be heated to a high temperature, say above 1000° F., at which temperature a substantial amount of volatile matter and moisture is driven off. In general it may be said that the higher the temperature to which this type of catalyst is heated, the more rugged it will become. However, it is noted that as the temperature of heating is increased, the catalyst tends to become less active.

The ability of a catalyst to retain its activity when heated to high temperatures is important not only in the preliminary heat treatment to increase mechanical strength but also in the catalytic dehydrogenation reaction itself and in the regeneration of the catalyst when its activity has been reduced by the deposition of carbonaceous contaminants thereupon. Thus it frequently happens during the dehydrogenation reaction, and particularly during the regeneration, that excessively high temperatures may be developed in local spots in the catalyst mass and if these temperatures are high enough to cause loss of activity it can be seen that care must be taken to prevent such local overheating. In regenerating the catalyst it is of great advantage to be able to conduct the regeneration at as high a temperature as possible because this means that the necessity for constant cooling of the catalyst mass is greatly reduced. It can be seen therefore that if the catalyst is one which loses its activity when heated to certain temperatures, care must be taken to prevent these temperatures from being reached either during the reaction period or during the regeneration period.

I have now found that a catalyst comprising a major proportion of aluminum oxide and a minor proportion of chromium oxide can be made substantially more heat resistant and thereby retain its activity at substantially higher temperatures if approximately one-half of the chromium oxide is replaced by nickel oxide. Thus, for example, I have found that a catalyst comprising about 96% aluminum oxide, 2% chromium oxide and 2% nickel oxide may be heated to temperatures between 1600 and 1800° F. without losing its activity to an appreciable extent whereas a catalyst comprising 96% aluminum oxide and 4% chromium oxide loses a substantial amount of its activity on being heated above 1600° F.

The improved catalysts according to my invention, therefore, comprise a major proportion of aluminum oxide and minor proportions of chromium oxide and nickel oxide with the chromium and nickel oxides preferably in substantially equal amounts.

These catalysts may be prepared by impregnating Activated Alumina, alumina gels, peptized alumina gels, bauxite, alumina hydrates and other forms of aluminum oxide with a mixture of solutions of chromium and nickel nitrates and then heating the resulting mass to temperatures between 600 and 800° F. The concentration of chromium and nickel nitrates in the solution are adjusted so that the final heated mass will contain the desired quantities of chromium and nickel oxides. It will be understood that soluble salts of chromium and nickel other than the nitrates may be used for impregnating the aluminum oxide.

The following experimental data indicate the heat resistant properties of the improved catalyst in comparison with those of the known catalyst:

Two catalysts are prepared, one consisting of 96% Activated Alumina and 4% chromium oxide and the other consisting of 96% Activated Alumina, 2% chromium oxide and 2% nickel oxide. Isobutane is passed over each catalyst at a rate of 175 volumes of isobutane per volume of catalyst per hour at a temperature of 1075° F. In the first experiment the catalysts are not preheated to a high temperature. In the second, third and fourth experiments the catalysts are heated to temperatures of 1600° F., 1800° F. and 2000° F. respectively. The following tables show the results obtained. In the table the catalyst containing 4% chromium oxide and no nickel oxide will be designated as catalyst A, and the catalyst containing 2% chromium oxide and 2% nickel oxide will be designated as catalyst B:

|  | Experiment #1 no preheating | | Experiment #2 preheating to 1600° F. | |
| --- | --- | --- | --- | --- |
|  | A | B | A | B |
| Per cent unsaturates in exit gas | 29 | 26 | 26 | 26 |
| Per cent isobutylene in unsaturates | 89 | 89 | 94 | 90 |

|  | Experiment #3 preheating to 1800° F. | | Experiment #4 preheating to 2000° F. | |
| --- | --- | --- | --- | --- |
|  | A | B | A | B |
| Per cent unsaturates in exit gas | 14 | 20 | 8 | 12 |
| Per cent isobutylene in unsaturates | 64 | 88 | 65 | 82 |

It will be noted that when the two catalysts are heated to temperatures of 1600° F., they are substantially equivalent in activity as represented by the fact that about the same amount of unsaturates are produced and about the same percentage of the unsaturates consists of isobutylene. However, when the catalysts are heated to 1800° F., it will be noted that there is a marked decrease in the percent of unsaturates and percent of isobutylene produced with catalyst A, whereas the decrease with catalyst B is not nearly so great. This tendency is even more marked when both catalysts are heated to 2000° F.

I claim:

1. The process of dehydrogenating hydrocarbons having from 2 to 5 carbon atoms which comprises passing the hydrocarbons at dehydrogenating temperatures and pressures over a catalyst which consists of about 96% by weight of aluminum oxide, 2% by weight of chromium oxide and 2% by weight of nickel oxide, and which has been heated to a temperature between 1800° and 2000° F.

2. The process of dehydrogenating hydrocarbons having from 2 to 5 carbon atoms which comprises passing the hydrocarbons at dehydrogenating temperatures and pressures over a catalyst which contains about 96% by weight of aluminum oxide, 2% by weight of chromium oxide and 2% by weight of nickel oxide, and which has been heated to a temperature between 1800° and 2000° F., and regenerating the catalyst by removing coke deposits at intervals substantially at temperatures of the regeneration reaction without constant cooling.

3. The process of dehydrogenating hydrocarbons having from 2 to 5 carbon atoms which comprises passing the hydrocarbons at dehydrogenating temperatures and pressures over a catalyst which consists of a major proportion of aluminum oxide and minor substantially equal proportions of chromium oxide and nickel oxide and which has been heated to a temperature between 1800° and 2000° F.

4. The process of dehydrogenating hydrocarbons having from 2 to 5 carbon atoms which comprises passing the hydrocarbons at dehydrogenating temperatures and pressures over a catalyst which contains a major proportion of aluminum oxide and minor substantially equal proportions of chromium oxide and nickel oxide and which has been heated to a temperature between 1800° and 2000° F., and regenerating the catalyst by removing coke deposits at intervals substantially at temperatures of the regeneration reaction without constant cooling.

ALEXIS VOORHIES, Jr.